US011963147B2

(12) United States Patent
Gulati et al.

(10) Patent No.: US 11,963,147 B2
(45) Date of Patent: *Apr. 16, 2024

(54) CONFIGURATION OF SIDELINK RADIO RESOURCES

(71) Applicant: QUALCOMM Incorporated, San Diego, CA (US)

(72) Inventors: Kapil Gulati, Belle Mead, NJ (US); Sudhir Kumar Baghel, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/808,872

(22) Filed: Jun. 24, 2022

(65) Prior Publication Data

US 2022/0400485 A1     Dec. 15, 2022

Related U.S. Application Data

(63) Continuation of application No. 16/678,752, filed on Nov. 8, 2019, now Pat. No. 11,375,501.

(60) Provisional application No. 62/760,084, filed on Nov. 13, 2018.

(51) Int. Cl.
*H04W 72/04*     (2023.01)
*H04W 72/0446*     (2023.01)
*H04W 72/23*     (2023.01)
*H04W 92/18*     (2009.01)

(52) U.S. Cl.
CPC ....... *H04W 72/0446* (2013.01); *H04W 72/23* (2023.01); *H04W 92/18* (2013.01)

(58) Field of Classification Search
CPC ......... H04W 72/0406; H04W 72/0446; H04W 72/042; H04W 92/18; H04W 52/0225; H04W 4/46

See application file for complete search history.

(56) References Cited

U.S. PATENT DOCUMENTS 9,729,295 B2 *    8/2017    Zhang ................... H04L 1/1861
11,375,501 B2      6/2022    Gulati et al.
(Continued)

FOREIGN PATENT DOCUMENTS

AU     2014305302 A1     3/2016
WO     2017171390 A1    10/2017
WO     2018204131 A1    11/2018

OTHER PUBLICATIONS

International Preliminary Report on Patentability—PCT/US2019/060755, The International Bureau of WIPO—Geneva, Switzerland, dated May 27, 2021.

(Continued)

*Primary Examiner* — Wei Zhao
(74) *Attorney, Agent, or Firm* — Arun Swain

(57) ABSTRACT

Various aspects of the present disclosure generally relate to wireless communication. In some aspects, a user equipment may receive, from a base station, a slot configuration identifying one or more symbols to be used for sidelink communications. The user equipment may transmit an indication of the slot configuration to another user equipment to configure the other user equipment to use the identified one or more symbols for sidelink communications. Numerous other aspects are provided.

30 Claims, 8 Drawing Sheets

(56) References Cited

U.S. PATENT DOCUMENTS

| | | | |
|---|---|---|---|
| 2011/0244800 A1* | 10/2011 | Bogestam | H04L 67/306 |
| | | | 455/41.2 |
| 2012/0114014 A1* | 5/2012 | Gaal | H04B 7/0456 |
| | | | 375/135 |
| 2013/0294318 A1 | 11/2013 | Amerga et al. | |
| 2017/0064558 A1 | 3/2017 | Li | |
| 2018/0324842 A1 | 11/2018 | Gulati et al. | |
| 2019/0059084 A1 | 2/2019 | Lee et al. | |
| 2019/0124673 A1 | 4/2019 | Seo et al. | |
| 2020/0029318 A1* | 1/2020 | Guo | H04L 1/1822 |
| 2021/0250931 A1* | 8/2021 | Yang | H04L 5/0053 |

OTHER PUBLICATIONS

International Search Report and Written Opinion—PCT/US2019/060755—ISA/EPO—dated Feb. 18, 2020.

* cited by examiner

CONFIGURATION OF SIDELINK RADIO RESOURCES

CROSS-REFERENCE TO RELATED APPLICATIONS

This application is a continuation of U.S. patent application Ser. No. 16/678,752, filed Nov. 8, 2019, entitled "CONFIGURATION OF SIDELINK RADIO RESOURCES" (now U.S. Pat. No. 11,375,501), which claims priority to U.S. Provisional Patent Application No. 62/760,084, filed on Nov. 13, 2018, entitled "DYNAMIC CONFIGURATION OF SIDELINK RADIO RESOURCES," which are hereby expressly incorporated by reference herein.

INTRODUCTION

Aspects of the present disclosure generally relate to wireless communication, and more particularly to techniques and apparatuses for configuration of sidelink radio resources.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include receiving, from a base station, a slot configuration identifying one or more symbols to be used for sidelink communications. The method may include transmitting an indication of the slot configuration to another user equipment to configure the other user equipment to use the identified one or more symbols for sidelink communications.

In some aspects, a user equipment for wireless communication may include memory and one or more processors coupled to the memory. The memory and the one or more processors may be configured to receive, from a base station, a slot configuration identifying one or more symbols to be used for sidelink communications. The memory and the one or more processors may be configured to transmit an indication of the slot configuration to another user equipment to configure the other user equipment to use the identified one or more symbols for sidelink communications.

In some aspects, a non-transitory computer-readable medium may store one or more instructions for wireless communication. The one or more instructions, when executed by one or more processors of a user equipment, may cause the one or more processors to receive, from a base station, a slot configuration identifying one or more symbols to be used for sidelink communications. The one or more instructions, when executed by one or more processors of a user equipment, may cause the one or more processors to transmit an indication of the slot configuration to another user equipment to configure the other user equipment to use the identified one or more symbols for sidelink communications.

In some aspects, an apparatus for wireless communication may include means for receiving, from a base station, a slot configuration identifying one or more symbols to be used for sidelink communications. The apparatus may include means for transmitting an indication of the slot configuration to another apparatus to configure the other apparatus to use the identified one or more symbols for sidelink communications.

In some aspects, a method of wireless communication, performed by a user equipment, may include receiving, from another user equipment associated with a base station, a slot configuration identifying one or more symbols to be used for sidelink communications, the user equipment not being associated with the base station; and performing sidelink communications using the identified one or more symbols.

In some aspects, a user equipment for wireless communication may include memory and one or more processors coupled to the memory. The memory and the one or more processors may be configured to receive, from another user equipment associated with a base station, a slot configuration identifying one or more symbols to be used for sidelink communications, the user equipment not being associated with the base station; and perform sidelink communications using the identified one or more symbols.

In some aspects, a non-transitory computer-readable medium may store one or more instructions for wireless communication. The one or more instructions, when executed by one or more processors of a user equipment, may cause the one or more processors to receive, from another user equipment associated with a base station, a slot configuration identifying one or more symbols to be used for sidelink communications, the user equipment not being associated with the base station; and perform sidelink communications using the identified one or more symbols.

In some aspects, an apparatus for wireless communication may include means for receiving, from another apparatus associated with a base station, a slot configuration identifying one or more symbols to be used for sidelink communications, the apparatus not being associated with the base station; and means for performing sidelink communications using the identified one or more symbols.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It should be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
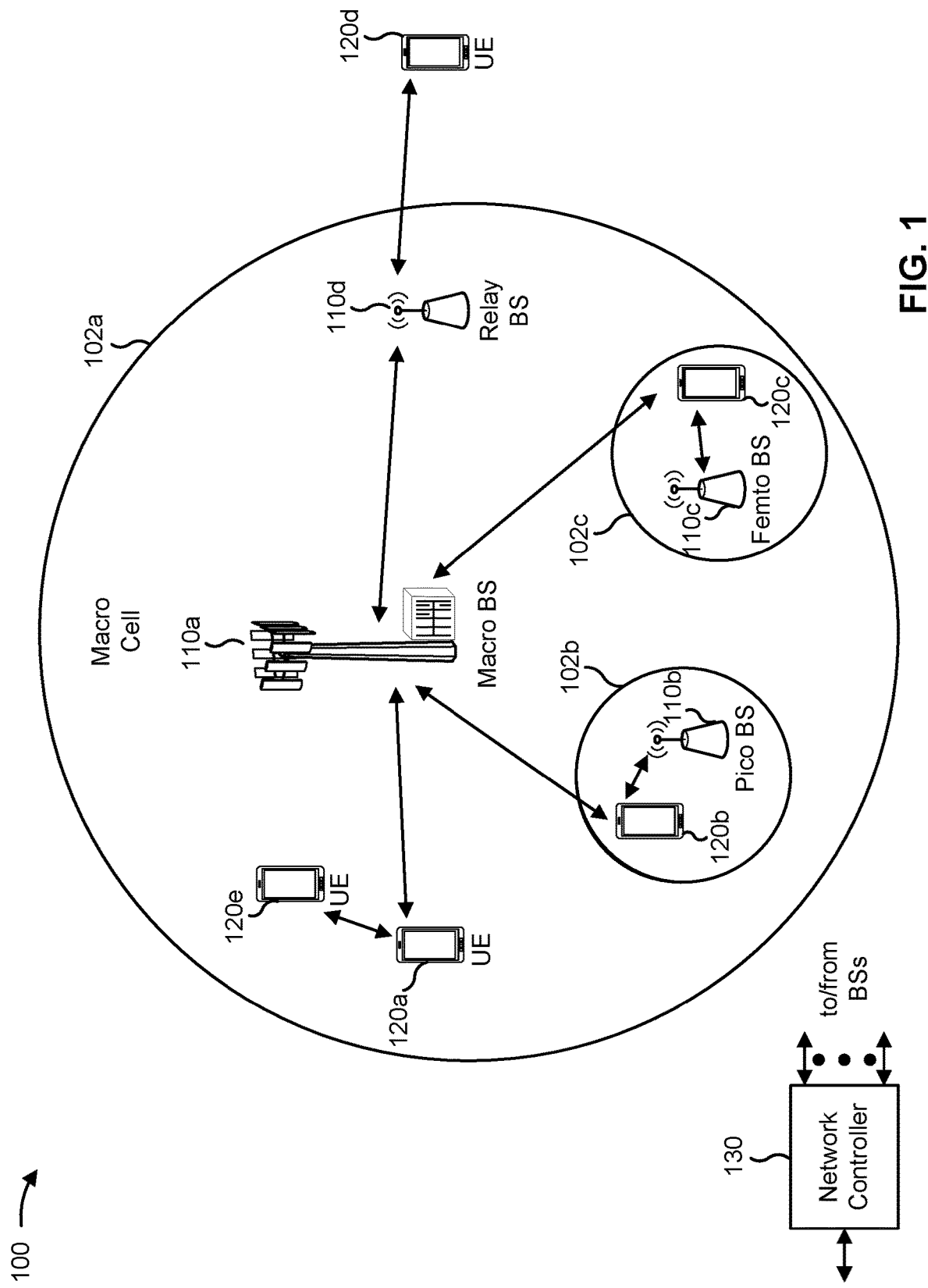
FIG. 1 is a block diagram conceptually illustrating an example of a wireless communication network, in accordance with various aspects of the present disclosure.

In a wireless network, a user equipment may communicate with other devices in the wireless network, such as a base station, anther user equipment, and/or the like. The user equipment may communicate with a base station by transmitting an uplink communication to the base station and/or by receiving a downlink communication from the base station. The user equipment may communicate with the other user equipment by transmitting a sidelink communication (e.g., a communication that is transmitted directly between the user equipment and the other user equipment, without the use of the base station) to the other user equipment, by receiving a sidelink communication from the other user equipment, and/or the like.

In some cases, the base station may configure the user equipment with a slot configuration for downlink communications, uplink communications, sidelink communications, and/or the like. The slot configuration may specify one or more slots, one or more symbols included in one or more slots, and/or the like, included in the radio resources of the wireless network, that are permitted to be used by the user equipment for downlink communications, uplink communications, sidelink communications, and/or the like. The user equipment may perform downlink communications and/or uplink communications with the base station based at least in part on the slot configuration, may perform sidelink communications with the other user equipment based at least in part on the slot configuration, and/or the like.

In some cases, a slot configuration may be a semi-static slot configuration in that the slot configuration includes one or more symbols and/or one or more slots that are statically configured (e.g., that are pre-configured, that are not typically changed, and/or the like) and one or more symbols and/or one or more slots that are permitted to be dynamically configured by a base station. In some cases, a user equipment may be configured with a semi-static slot configuration by receiving the semi-static slot configuration from a base station (e.g., when in a coverage area of the base station and being served by the base station), by being configured with a radio resource pre-configuration (e.g., a radio resource configuration that is configured on the user equipment when the user equipment is deployed), and/or the like.

In some cases, a slot configuration may be a dynamic slot configuration in that the slot configuration dynamically (e.g., periodically, aperiodically, semi-periodically, as needed, and/or the like) configures one or more symbols and/or slots that are identified in a semi-static slot configuration as being permitted to be dynamically configured by a base station. In some cases, a user equipment may be configured with a dynamic slot configuration by receiving the dynamic slot configuration from the base station (e.g., when in a coverage area of the base station and being served by the base station).

However, if the user equipment is not within the coverage area of the base station and/or not being served by the base station, the user equipment may be unable to receive the dynamic slot configuration. As a result, the user equipment may not be informed that the user equipment is permitted to use one or more symbols and/or one or more slots for sidelink communications with another user equipment, which reduces the efficiency of radio resources in the wireless network. Moreover, if the user equipment is not configured with the dynamic slot configuration, the user equipment may be unaware that another user equipment is attempting to perform sidelink communications with the user equipment using one or more symbols and/or one or more slots identified in the dynamic slot configuration, which may cause slidelink communications in the wireless network to be delayed, dropped, and/or retransmitted, which further reduces efficiency and reliability in the wireless network.

Some aspects described herein provide techniques and apparatuses for configurating sidelink radio resources. In some aspects, a user equipment that is associated with a base station (e.g., that is within a coverage area of the base station and is being served by the base station) may receive a slot configuration from the base station, and may transmit the slot configuration to another user equipment via a sidelink channel between the user equipment and the other user equipment. In this way, if the other user equipment is not associated with the base station (e.g., is not within the coverage area of the base station and/or is not being served by the base station), the other user equipment may still receive the slot configuration. This increases the flexibility of the base station to configure symbols and/or slots for uplink communications, downlink communications, and/or sidelink communications for user equipment that may not be associated with the base station, which increases the functionality of the base station and the unassociated user equipment. Moreover, this increases the operating efficiency of the wireless network in which the base station and/or the user equipment are included by enabling the base station to generate and/or modify slot configurations based at least in part on operating conditions in the wireless network, such as interference in the coverage area of the base station, the quantity of user equipment communicatively connected to the base station, the quantity of user equipment that intend to use sidelink communications, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network, a 5G or NR network, and/or the like. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, in some aspects, the communication manager 140 may receive, from a base station, a slot configuration identifying one or more symbols to be used for sidelink communications, may transmit an indication of the slot configuration to another user equipment to configure the other user equipment to use the one or more symbols for sidelink communications, and/or the like. As described in more detail elsewhere herein, in some aspects, the communication manager 140 may receive, from another user equipment associated with a base station, a slot configuration identifying one or more symbols to be used for sidelink communications, the user equipment not being associated with the base station, may perform sidelink communications using the one or more symbols, and/or the like. Additionally, or alternatively, the communication manager 140 may perform one or more other operations described herein.

As indicated above, FIG. 1 is provided merely as an example. Other examples may differ from what is described with regard to FIG. 1.

Figure 2:
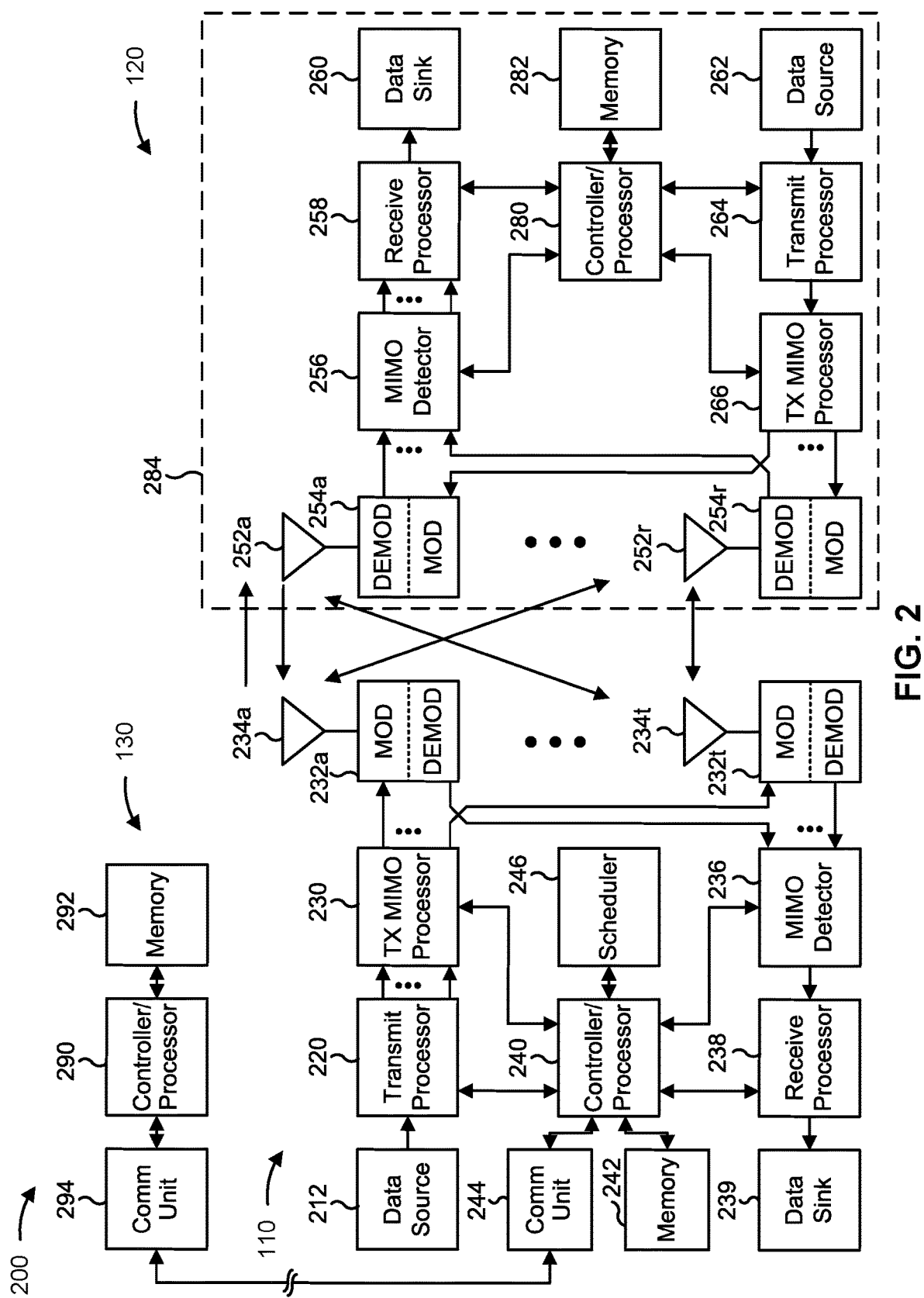
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with configuration of sidelink radio resources, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for receiving, from a base station 110, a slot configuration identifying one or more symbols to be used for sidelink communications, means for transmitting an indication of the slot configuration to another user equipment 120 to configure the other user equipment 120 to use the one or more symbols for sidelink communications, and/or the like. In some aspects, the UE 120 may include means for receiving, from another user equipment associated with a base station 110, a slot configuration identifying one or more symbols to be used for sidelink communications, the user equipment 120 not being associated with the base station 110, means for performing sidelink communications using the one or more symbols, and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

As indicated above, FIG. 2 is provided merely as an example. Other examples may differ from what is described with regard to FIG. 2.

Figure 3:
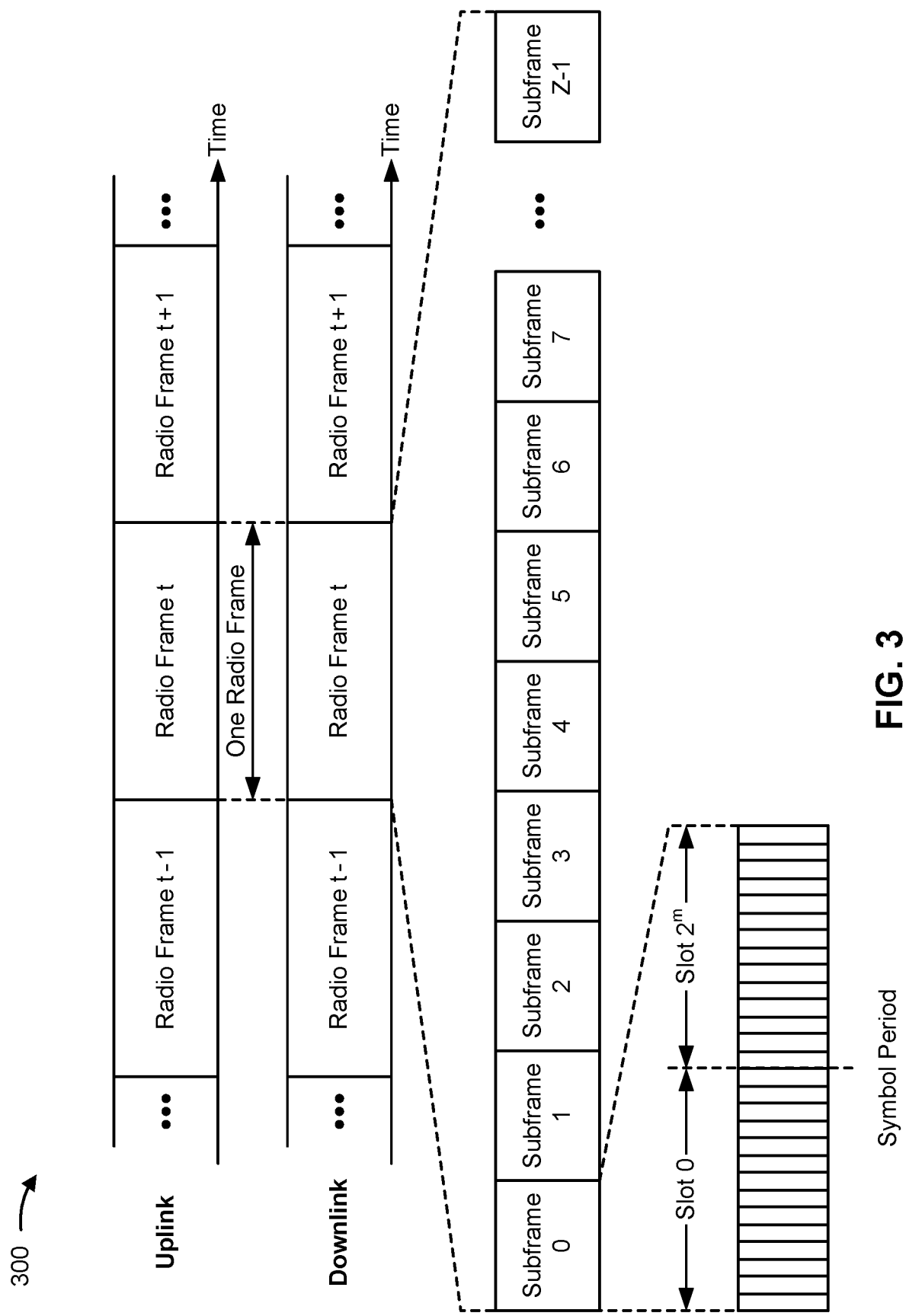
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

In some aspects, a base station 110 may transmit a slot configuration to a UE 120. For example, a base station 110 may transmit a semi-static slot configuration to a UE 120, may transmit a dynamic slot configuration to a UE 120, and/or the like. In some aspects, a semi-static slot configuration may be semi-static in that a portion of the slot configuration is statically configured and another portion of the slot configuration is permitted to be dynamically configured. For example, a semi-static slot configuration may include a configuration of one or more symbols and/or slots, of a subframe, that are permitted to be used for uplink communications (e.g., communications from a UE 120 to a base station 110), may include a configuration of one or more symbols and/or slots, included in a subframe, that are permitted to be used for downlink communications (e.g., communications from a base station 110 to a UE 120), may include a configuration of one or more symbols and/or slots, included in a subframe, that are permitted to be used for sidelink communications (e.g., communications between two or more UEs 120), may include a configuration of one or more symbols and/or slots, included in a subframe, that are permitted to be dynamically configured by a base station 110, and/or the like.

In some aspects, a dynamic slot configuration may be dynamic in that the dynamic slot configuration may dynamically (e.g., periodically, aperiodically, semi-periodically, as needed, and/or the like) configure one or more symbols and/or slots identified in a semi-static slot configuration that are identifies as being permitted to be dynamically configured by a base station 110. In this way, the dynamic slot configuration provides a base station 110 with increased flexibility in configuring symbols and/or slots for uplink communications, downlink communications, and/or sidelink communications. This increases the operating efficiency of base station 110, of the wireless network in which base station 110 is included, and/or of the UEs 120 included in the communication network by enabling base station 110 to generate and/or modify slot configurations based at least in part on operating conditions, such as interference in the coverage area of base station 110, the quantity of UEs 120 communicatively connected to the base station 110, the quantity of UEs 120 that intend to use sidelink communications, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In other systems (e.g., such NR or 5G systems), a Node B may transmit these or other signals in these locations or in different locations of the subframe.

As indicated above, FIG. 3 is provided merely as an example. Other examples may differ from what is described with regard to FIG. 3.

Figure 4A:
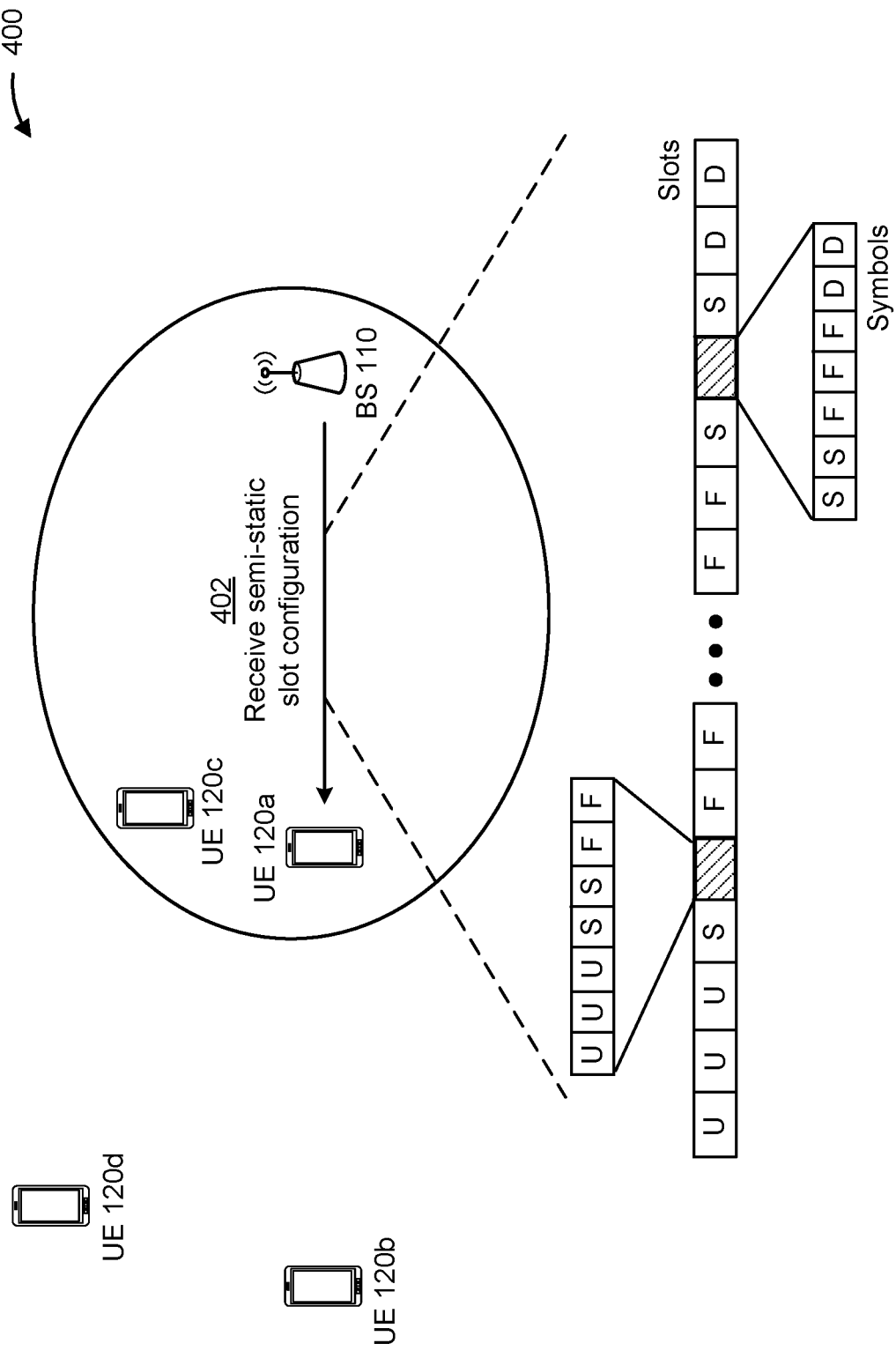
FIGS. 4A-4C are diagrams illustrating an example of configuration of sidelink radio resources, in accordance with various aspects of the present disclosure.
Figure 4B:
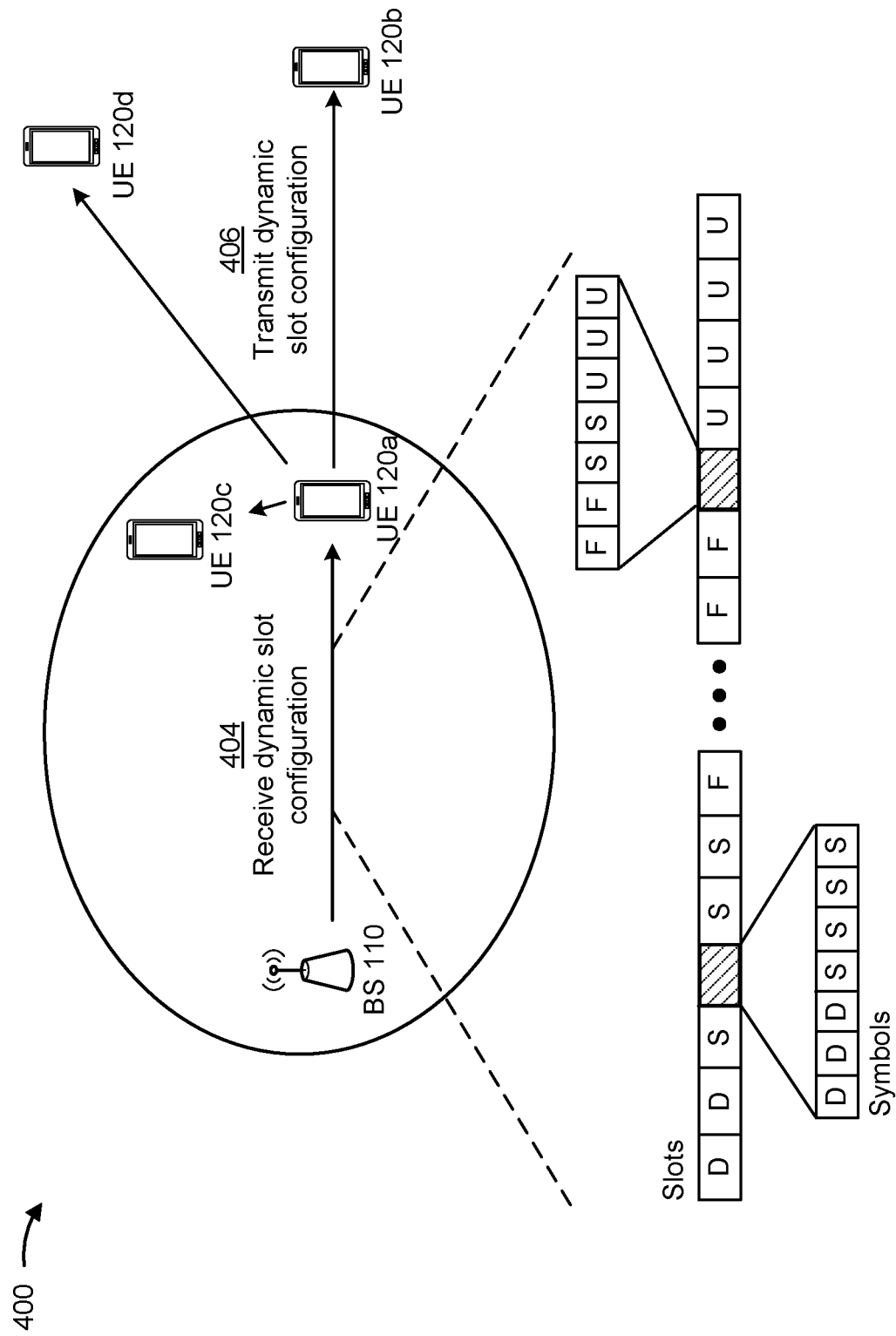
Figure 4C:
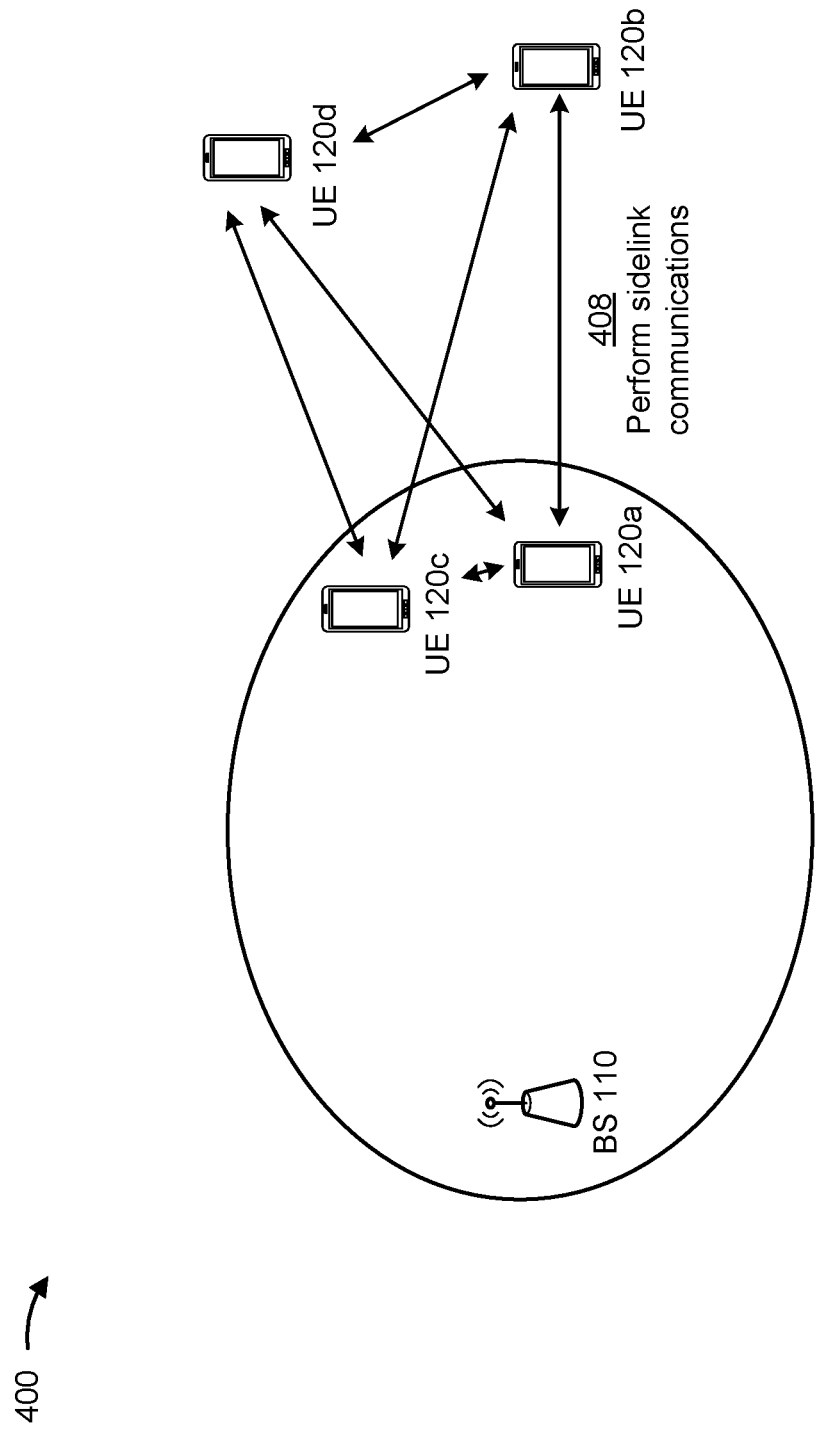

FIGS. 4A-4C are diagrams illustrating an example 400 of configuration of sidelink radio resources, in accordance with various aspects of the present disclosure. As shown in FIGS. 4A-4C, example 400 may include various devices, such as a base station (e.g., BS 110), a plurality of user equipment (e.g., UE 120*a*, UE 120*b*, UE 120*c*, UE 120*d*, and/or the like), and/or the like. While FIGS. 4A-4C illustrate example 400 including BS 110 and UEs 120*a*-120*d*, example 400 may include a greater quantity of base stations, a greater or lesser quantity of user equipment, and/or the like.

In some aspects, BS 110 and UEs 120*a*-120*d* may be included in a wireless network. In some aspects, BS 110 may provide a coverage area in the wireless network. User equipment that are within the geographic area covered by the coverage area of BS 110 (e.g., UE 120*a* and UE 120*c* in example 400), and that are being served by BS 110 (e.g., UE 120*a* in example 400) may communicate with BS 110 by transmitting uplink communications to BS 110, by receiving downlink communications from BS 110, and/or the like.

In some aspects, UEs 120*a*-120*d* may perform sidelink communications. For example, UE 120*a* may transmit a sidelink communication to UE 120*b*, may receive a sidelink communication from UE 120*c*, and/or the like. In this way, a user equipment may communicate directly with other user equipment regardless of whether the user equipment and/or the other user equipment are located within the coverage area of BS 110 and/or regardless of whether the user equipment and/or the other user equipment are being served by BS 110. Moreover, in this way, a user equipment (e.g., UE 120*b*) may communicate with BS 110 through a user equipment that is located within the coverage area of BS 110 and is being served by BS 110 (e.g., UE 120*a*).

As shown in FIG. 4A, UEs 120*a*-120*b* may be configured with a semi-static slot configuration. In some aspects, the semi-static slot configuration may be generated at the wireless network level such that a plurality of base stations, included in the wireless network, are configured to use and/or transmit the semi-static slot configuration in the wireless network. The semi-static slot configuration may specify how radio resources in the wireless network are permitted to be used. For example, the semi-static slot configuration may specify that one or more symbols and/or one or more slots (marked by a "D") of the radio resources in the wireless network are permitted to be used for downlink communications (e.g., for communications transmitted by BS 110 to a user equipment). As another example, the semi-static slot configuration may specify that one or more symbols and/or the one or more slots (marked by a "U") of the radio resources in the wireless network are permitted to be used for uplink communications (e.g., for communications transmitted by a user equipment to BS 110). As another example, the semi-static slot configuration may specify that one or more symbols and/or one or more slots (marked by an "S") of the radio resources in the wireless network are permitted to be used for sidelink communications (e.g., for communications directly between user equipment in the wireless network).

In some aspects, the semi-static slot configuration may specify that one or more symbols and/or one or more slots (marked by an "F") of the radio resources in the wireless network are permitted to be dynamically configured by a base station in the wireless network (e.g., BS 110). In this way, BS 110 may periodically, aperiodically, semi-periodically, and/or the like, configure the one or more symbols and/or the one or more slots, that are permitted to be dynamically configured, to be permitted to be used for downlink communications, uplink communications, and/or sidelink communications.

In some aspects, the semi-static slot configuration may be specified using a TDD-UL_DL-ConfigCommon command, a TDD-UL_DL-ConfigDedicated command, and/or the like. In some aspects, the semi-static slot configuration may explicitly specify the one or more symbols and/or the one or more slots that are permitted to be used for downlink communications, the one or more symbols and/or the one or more slots that are permitted to be used for uplink communications, the one or more symbols and/or the one or more slots that are permitted to be used for sidelink communications, and/or the one or more symbols and/or the one or more slots that are permitted to be dynamically configured. For example, the semi-static slot configuration may specify each symbol and/or slot that is permitted to be used for downlink communications. As another example, the semi-static slot configuration may specify a group of symbols and/or a group of slots that are permitted to be used for uplink communications (e.g., by specifying a starting slot and an ending slot of the group of slots).

In some aspects, instead of specifying one or more symbols and/or one or more slots that are permitted to be used for sidelink communications, the user equipment included in the wireless network may be configured (e.g., by BS 110, by being pre-configured, and/or the like) to use a subset of the one or more symbols and/or the one more slots, that are specified in the semi-static slot configuration as being permitted to be used for uplink communications, for sidelink communications. In this way, overhead of implementing sidelink communications in the wireless network may be reduced by reducing the quantity of symbol and/or slot types that are specified in the semi-static slot configuration.

In some aspects, the one or more symbols and/or the one or more slots that are permitted to be dynamically configured may be implicitly specified in the semi-static slot configuration. For example, BS 110 and UEs 120*a*-120*d* may be configured to determine that if a symbol and/or a slot that is not specified, in the semi-static slot configuration, as being permitted to be used for a particular type of communication, the slot and/or symbol is permitted to be dynamically configured by BS 110. In this way, by not explicitly specifying the one or more symbols and/or the one or more slots that are permitted to be dynamically configured, the amount of information included in the semi-static slot configuration is reduced, which in turn reduces the amount of radio resources that are used to transmit semi-static slot configurations in the wireless network.

As further shown in FIG. 4A, and as shown by reference number 402, UE 120*a* may receive a semi-static slot configuration from BS 110. In some aspects, UE 120*a* may receive the semi-static slot configuration from BS 110 based at least in part on being located within the coverage area of BS 110, and based at least in part on being served by BS 110. In some aspects, BS 110 may transmit the semi-static slot configuration to UE 120*a* in a signaling communication, such as a radio resource control (RRC) communication, a downlink control information (DCI) communication, and/or the like. In some aspects, UE 120*b*-UE 120*d* may be configured with the semi-static slot configuration based at least in part on being configured with a radio resource pre-configuration (e.g., prior to being deployed in the wireless network, after being deployed in the wireless network, and/or the like).

As shown in FIG. 4B, BS 110 may dynamically configure the one or more symbols and/or the one or more slots that are identified in the semi-static slot configuration as being permitted to be dynamically configured. In this way, BS 110 may periodically, aperiodically, semi-periodically, and/or the like, configure the one or more symbols and/or the one or more slots to be used for downlink communications, uplink communications, and/or sidelink communications.

In some aspects, the dynamic slot configuration may explicitly specify the one or more symbols and/or the one or more slots that are permitted to be used for downlink communications, uplink communications, and/or sidelink communications. For example, the dynamic slot configuration may specify each symbol and/or slot, of the one or more symbols and/or the one or more slots that are permitted to be dynamically configured, that is permitted to be used for sidelink communications. As another example, the dynamic slot configuration may specify a group of symbols and/or a group of slots, of the one or more symbols and/or the one or more slots that are permitted to be dynamically configured, that are permitted to be used for sidelink communications (e.g., by specifying a starting slot and an ending slot of the group of slots).

In some aspects, instead of specifying one or more symbols and/or one or more slots, of the one or more symbols and/or the one or more slots that are permitted to be dynamically configurated, that are permitted to be used for sidelink communications, the user equipment included in the wireless network may be configured (e.g., by BS 110, by being pre-configured, and/or the like) to use a subset of the one or more symbols and/or the one more slots, that are specified in the dynamic slot configuration as being permitted to be used for uplink communications, for sidelink communications. In this way, overhead of implementing sidelink communications in the wireless network may be reduced by reducing the quantity of symbol and/or slot types that are specified in the dynamic slot configuration.

In some aspects, BS 110 may determine which symbols and/or slots to configure for downlink communications, uplink communications, and/or sidelink communications based at least in part on various factors, such as a quantity of user equipment being served by BS 110, an amount of interference in the coverage area of BS 110, a quantity of user equipment that have indicated an interest in performing sidelink communications, the frequency band on which BS 110 is operating, and/or the like.

As further shown in FIG. 4B, and by reference number 404, BS 110 may transmit the dynamic slot configuration to one or more user equipment that are in the coverage area of BS 110 and are being served by BS 110 (e.g., UE 120a). In some aspects, BS 110 may transmit the dynamic slot configuration in signaling communication, such as an RRC communication, a DCI communication (e.g., using a DCI Format 2_0 type of DCI communication, which may include a DCI communication for notifying a user equipment of a slot configuration), and/or the like.

In some aspects, BS 110 may transmit the dynamic slot configuration to UE 120a based at least in part on receiving, from UE 120a, a communication that indicates an interest in performing sidelink communications. BS 110 may transmit, to UE 120a and based at least in part on receiving the communication that indicates an interest in performing sidelink communications, a sidelink slot format indication (SFI) radio network temporary identifier (SFI_RNTI_SL) associated with UE 120a. In this way, BS 110 may scramble the signaling communication, that includes the dynamic slot configuration, using the SFI_RNTI_SL associated with UE 120a to monitor a downlink channel between BS 110 and UE 120a to identify the signaling communication.

As further shown in FIG. 4B, and by reference number 406, UE 120a may transmit, in a communication, the dynamic slot configuration to one or more other user equipment in the wireless network (e.g., UEs 120b-120d). In some aspects, UE 120a may transmit the dynamic slot configuration to another user equipment using a symbol that has been dynamically configured, by BS 110, to be permitted to be used for sidelink communications. In some aspects, UE 120a may transmit the dynamic slot configuration to the other user equipment on a sidelink data channel between UE 120a and the other user equipment. In some aspects, UE 120a may transmit the dynamic slot configuration to the other user equipment using a medium access control control element (MAC-CE) of the sidelink data channel. When UE 120a transmits the dynamic configuration to the other user equipment on the sidelink data channel, the communication including the dynamic slot configuration may also include information identifying a starting slot at which the dynamic slot configuration applies.

In some aspects, instead of transmitting the dynamic configuration to the other user equipment, UE 120a may transmit a sidelink communication, to the other user equipment, using a symbol and/or slot that is specified in the dynamic slot configuration as being permitted to be used for sidelink communications. In this way, the other user equipment may be configured to determine that, by receiving the sidelink communication from UE 120a, one or more other symbols and/or one or more other slots, that are adjacent to the symbol and/or slot in which the sidelink communication was received, are permitted to be used for sidelink communications. In this way, UE 120a may implicitly specify the one or more other symbols and/or the one or more other slots to the other user equipment.

As shown in FIG. 4C, and by reference number 408, UEs 120a-120d may perform sidelink communications based at least in part on the semi-static slot configuration and/or based at least in part on the dynamic slot configuration. For example UEs 120a-120d may transmit and/or receive sidelink communications based at least in part on the one or more symbols and/or the one or more slots that are specified (e.g., in the semi-static slot configuration, in the dynamic slot configuration, and/or the like) as being permitted to be used for sidelink communications.

In this way, UE 120a, which is associated with BS 110, may receive a dynamic slot configuration from BS 110, and may transmit the dynamic slot configuration to UEs 120b-120d. In this way, if UEs 120b-120d are not associated with BS 110, UEs 120b-120d may still receive the dynamic slot configuration. This increases the flexibility of BS 110 to configure symbols and/or slots for uplink communications, downlink communications, and/or sidelink communications for UEs 120b-120d, which increases the functionality of BS 110 and UEs 120b-120d. Moreover, this increases the operating efficiency of the wireless network in which BS 110 and/or UEs 120b-120d are included by enabling BS 110 to generate and/or modify symbol and/or slot configurations based at least in part on operating conditions in the wireless network.

As indicated above, FIGS. 4A-4C are provided as an example. Other examples may differ from what is described with respect to FIGS. 4A-4C.

Figure 5:
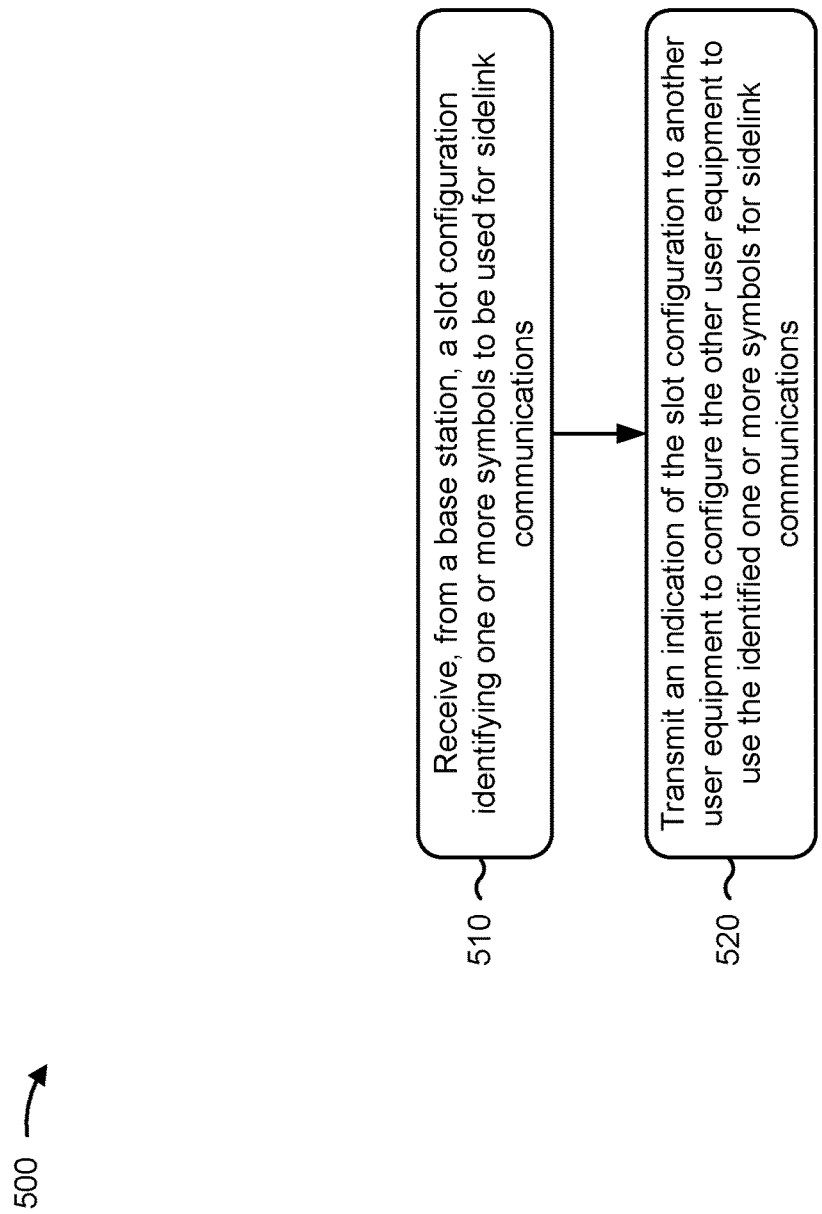
FIG. 5 is a diagram illustrating an example process performed, for example, by a user equipment, in accordance with various aspects of the present disclosure.

FIG. 5 is a diagram illustrating an example process 500 performed, for example, by a user equipment, in accordance with various aspects of the present disclosure. Example process 500 is an example where a user equipment (e.g., UE 120) performs configuration of sidelink radio resources.

As shown in FIG. 5, in some aspects, process 500 may include receiving, from a base station, a slot configuration identifying one or more symbols to be used for sidelink communications (block 510). For example, the user equipment (e.g., using communication manager 140, receive processor 258, controller/processor 280, memory 282, and/or the like) may receive, from a base station, a slot configuration identifying one or more symbols to be used for sidelink communications, as described above.

As further shown in FIG. 5, in some aspects, process 500 may include transmitting an indication of the slot configuration to another user equipment to configure the other user equipment to use the identified one or more symbols for sidelink communications (block 520). For example, the user equipment (e.g., using communication manager 140, receive processor 258, controller/processor 280, memory 282, and/or the like) may transmitting an indication of the slot configuration to another user equipment to configure the other user equipment to use the identified one or more symbols for sidelink communications, as described above.

Process 500 may include additional aspects, such as any single aspect or any combination of aspects described below and/or in connection with one or more other processes described elsewhere herein.

In a first aspect, process 500 includes receiving, from the base station, an indication of a semi-static slot configuration that specifies one or more second symbols to be used for sidelink communications, and one or more third symbols to be dynamically configured by the base station; and wherein the slot configuration identifying the one or more symbols comprises a dynamic slot configuration that causes the one or more third symbols to be dynamically configured by the base station as the one or more symbols to be used for sidelink communications. In a second aspect, alone or in combination with the first aspect, the semi-static slot configuration specifies one or more slots to be used for sidelink communications. In a third aspect, alone or in combination with one or more of the first or second aspects, the semi-static slot configuration specifies one or more uplink symbols to be used for sidelink communications.

In a fourth aspect, alone or in combination with one or more of the first through third aspects, the semi-static slot configuration specifies one or more uplink slots to be used for sidelink communications. In a fifth aspect, alone or in combination with one or more of the first through fourth aspects, the dynamic slot configuration specifies one or more slots to be used for sidelink communications. In a sixth aspect, alone or in combination with one or more of the first through fifth aspects, the one or more symbols to be used for sidelink communications comprise one or more uplink symbols to be used for sidelink communications.

In a seventh aspect, alone or in combination with one or more of the first through sixth aspects, wherein the dynamic slot configuration specifies one or more uplink slots to be used for sidelink communications. In an eighth aspect, alone or in combination with one or more of the first through seventh aspects, wherein transmitting the indication of the slot configuration comprises transmitting the indication of the slot configuration in a first symbol of the one or more symbols.

In a ninth aspect, alone or in combination with one or more of the first through eighth aspects, transmitting the indication of the slot configuration comprises transmitting the indication of the slot configuration in a sidelink communication on a sidelink channel between the user equipment and the other user equipment, the sidelink communication comprising at least one of a medium access control control element communication, a sidelink control information communication, or a radio resource control communication. In a tenth aspect, alone or in combination with one or more of the first through ninth aspects, receiving the slot configuration comprises receiving the slot configuration in a downlink communication, the downlink communication comprising at least one of a radio resource control communication, a downlink control information communication, or a medium access control control element communication.

In an eleventh aspect, alone or in combination with one or more of the first through tenth aspects, the downlink communication is scrambled using a sidelink slot format indication radio network temporary identifier associated with the user equipment. In a twelfth aspect, alone or in combination with one or more of the first through eleventh aspects, process 500 further includes transmitting, to the base station and on an uplink channel, an uplink communication that indicates interest in performing sidelink communications, receiving, from the base station, the sidelink slot format indication radio network temporary identifier, and monitoring, based at least in part on receiving the sidelink slot format indication radio network temporary identifier, a downlink channel between the base station and the user equipment for the downlink communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
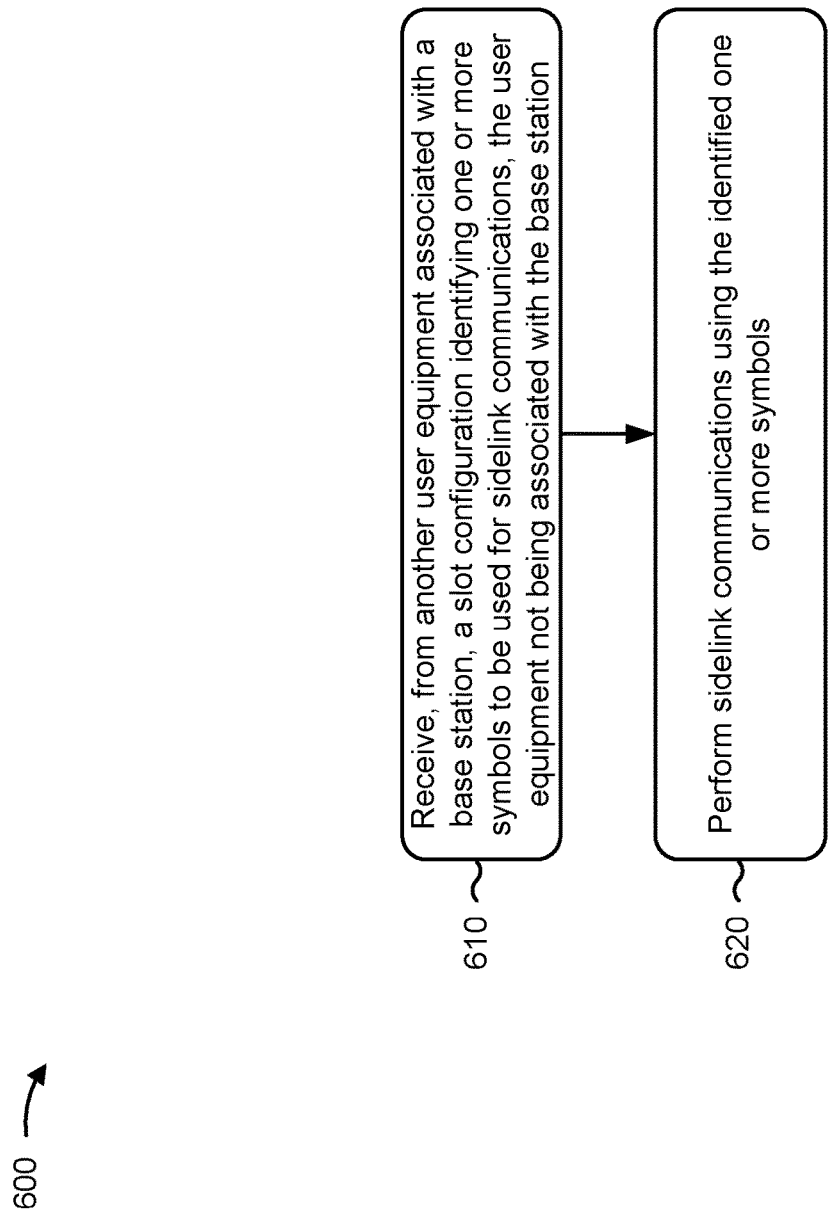
FIG. 6 is a diagram illustrating an example process performed, for example, by a user equipment, in accordance with various aspects of the present disclosure.

FIG. 6 is a diagram illustrating an example process 600 performed, for example, by a user equipment, in accordance with various aspects of the present disclosure. Example process 600 is an example where a user equipment (e.g., UE 120) performs configuration of sidelink radio resources.

As shown in FIG. 6, in some aspects, process 600 may include receiving, from another user equipment associated with a base station, a slot configuration identifying one or more symbols to be used for sidelink communications, the user equipment not being associated with the base station (block 610). For example, the user equipment (e.g., using communication manager 140, receive processor 258, controller/processor 280, memory 282, and/or the like) may receive, from another user equipment associated with a base station, a slot configuration identifying one or more symbols to be used for sidelink communications, as described above. In some aspects, the user equipment is not associated with the base station.

As further shown in FIG. 6, in some aspects, process 600 may include performing sidelink communications using the identified one or more symbols (block 620). For example, the user equipment (e.g., using communication manager 140, receive processor 258, transmit processor 264, controller/processor 280, memory 282, and/or the like) may perform sidelink communications using the identified one or more symbols, as described above.

Process 600 may include additional aspects, such as any single aspect or any combination of aspects described below and/or in connection with one or more other processes described elsewhere herein.

In a first aspect, the semi-static slot configuration specifies one or more slots to be used for sidelink communications. In a second aspect, alone or in combination with the first aspect, the semi-static slot configuration specifies one or more uplink symbols to be used for sidelink communications. In a third aspect, alone or in combination with one or more of the first or second aspects, the semi-static slot configuration specifies one or more uplink slots to be used for sidelink communications. In a fourth aspect, alone or in combination with one or more of the first through third aspects, the dynamic slot configuration specifies one or more uplink slots to be used for sidelink communications.

In a fifth aspect, alone or in combination with one or more of the first through fourth aspects, the one or more symbols comprises one or more uplink symbols to be used for sidelink communications. In a sixth aspect, alone or in combination with one or more of the first through fifth aspects, the one or more symbols to be used for sidelink communications comprise one or more uplink symbols to be used for sidelink communications. In a seventh aspect, alone or in combination with one or more of the first through sixth aspects, receiving the slot configuration comprises receiving the slot configuration in a sidelink communication on a sidelink channel between the user equipment and the other user equipment, the sidelink communication comprising at least one of a medium access control control element communication, a sidelink control information communication, or a radio resource control communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
   receiving, from a network entity, an indication of a semi-static slot configuration that specifies:
      one or more first symbols to be used for sidelink communications, and
      one or more second symbols to be dynamically configured by the network entity;
   receiving, from the network entity, a slot configuration identifying one or more third symbols to be used for sidelink communications,
      wherein the slot configuration identifying the one or more third symbols comprises a dynamic slot configuration that causes the one or more second symbols to be dynamically configured by the network entity as the one or more third symbols; and
   transmitting a sidelink communication using the one or more first symbols or the one or more third symbols.

2. The method of claim 1, wherein the semi-static slot configuration specifies one or more slots to be used for sidelink communications.

3. The method of claim 1, wherein the semi-static slot configuration specifies one or more uplink symbols to be used for sidelink communications.

4. The method of claim 1, wherein the semi-static slot configuration specifies one or more uplink slots to be used for sidelink communications.

5. The method of claim 1, wherein the dynamic slot configuration specifies one or more slots to be used for sidelink communications.

6. The method of claim 1, wherein the one or more third symbols comprise:
   one or more uplink symbols to be used for sidelink communications.

7. The method of claim 1, wherein the dynamic slot configuration specifies one or more uplink slots to be used for sidelink communications.

8. The method of claim 1, further comprising:
   transmitting an indication of the slot configuration in a first symbol of the one or more third symbols.

9. The method of claim 1, further comprising:
   transmitting an indication of the slot configuration in a sidelink communication on a sidelink channel between the user equipment and the other user equipment, the sidelink communication comprising at least one of:
   a medium access control control element communication,
   a sidelink control information communication, or
   a radio resource control communication.

10. The method of claim 1, wherein receiving the slot configuration comprises:
receiving the slot configuration in a downlink communication, the downlink communication comprising at least one of:
a radio resource control communication,
a downlink control information communication, or
a medium access control control element communication.

11. The method of claim 10, wherein the downlink communication is scrambled using a sidelink slot format indication radio network temporary identifier associated with the user equipment.

12. The method of claim 11, further comprising:
transmitting, on an uplink channel, an uplink communication that indicates interest in performing sidelink communications;
receiving the sidelink slot format indication radio network temporary identifier; and
monitoring, based at least in part on receiving the sidelink slot format indication radio network temporary identifier, a downlink channel between the network entity and the user equipment for the downlink communication.

13. A user equipment, comprising:
one or more memories; and
one or more processors, coupled to the one or more memories, configured to:
receive, from a network entity, an indication of a semi-static slot configuration that specifies:
one or more first symbols to be used for sidelink communications, and
one or more second symbols to be dynamically configured by the network entity;
receive, from the network entity, a slot configuration identifying one or more third symbols to be used for sidelink communications,
wherein the slot configuration identifying the one or more third symbols comprises a dynamic slot configuration that causes the one or more second symbols to be dynamically configured by the network entity as the one or more third symbols; and
transmit a sidelink communication using the one or more first symbols or the one or more third symbols.

14. The user equipment of claim 13, wherein the semi-static slot configuration specifies one or more slots to be used for sidelink communications.

15. The user equipment of claim 13, wherein the semi-static slot configuration specifies one or more uplink symbols to be used for sidelink communications.

16. The user equipment of claim 13, wherein the semi-static slot configuration specifies one or more uplink slots to be used for sidelink communications.

17. The user equipment of claim 13, wherein the dynamic slot configuration specifies one or more slots to be used for sidelink communications.

18. The user equipment of claim 13, wherein the one or more third symbols comprise:
one or more uplink symbols to be used for sidelink communications.

19. The user equipment of claim 13, wherein the dynamic slot configuration specifies one or more uplink slots to be used for sidelink communications.

20. The user equipment of claim 13, wherein the one or more processors are further configured to:
transmit an indication of the slot configuration in a first symbol of the one or more third symbols.

21. The user equipment of claim 13, wherein the one or more processors are further configured to:
transmit an indication of the slot configuration in a sidelink communication on a sidelink channel between the user equipment and the other user equipment, the sidelink communication comprising at least one of:
a medium access control control element communication,
a sidelink control information communication, or
a radio resource control communication.

22. The user equipment of claim 13, wherein the one or more processors, to receive the slot configuration, are configured to:
receive the slot configuration in a downlink communication, the downlink communication comprising at least one of:
a radio resource control communication,
a downlink control information communication, or
a medium access control control element communication.

23. The user equipment of claim 22, wherein the downlink communication is scrambled using a sidelink slot format indication radio network temporary identifier associated with the user equipment.

24. The user equipment of claim 23, wherein the one or more processors are further configured to:
transmit, on an uplink channel, an uplink communication that indicates interest in performing sidelink communications;
receive the sidelink slot format indication radio network temporary identifier; and
monitor, based at least in part on receiving the sidelink slot format indication radio network temporary identifier, a downlink channel between the network entity and the user equipment for the downlink communication.

25. A non-transitory computer-readable medium storing a set of instructions, the set of instructions comprising:
one or more instructions that, when executed by one or more processors of a user equipment, cause the user equipment to:
receive, from a network entity, an indication of a semi-static slot configuration that specifies:
one or more first symbols to be used for sidelink communications, and
one or more second symbols to be dynamically configured by the network entity;
receive, from the network entity, a slot configuration identifying one or more third symbols to be used for sidelink communications,
wherein the slot configuration identifying the one or more third symbols comprises a dynamic slot configuration that causes the one or more second symbols to be dynamically configured by the network entity as the one or more third symbols; and
transmit a sidelink communication using the one or more first symbols or the one or more third symbols.

26. The non-transitory computer-readable medium of claim 25, wherein the semi-static slot configuration specifies one or more slots to be used for sidelink communications.

27. The non-transitory computer-readable medium of claim 25, wherein the semi-static slot configuration specifies one or more uplink symbols to be used for sidelink communications.

28. The non-transitory computer-readable medium of claim 25, wherein the semi-static slot configuration specifies one or more uplink slots to be used for sidelink communications.

29. The non-transitory computer-readable medium of claim 25, wherein the dynamic slot configuration specifies one or more slots to be used for sidelink communications.

30. An apparatus, comprising:
- means for receiving, from a network entity, an indication of a semi-static slot configuration that specifies:
  - one or more first symbols to be used for sidelink communications, and
  - one or more second symbols to be dynamically configured by the network entity;
- means for receiving, from the network entity, a slot configuration identifying one or more third symbols to be used for sidelink communications,
  - wherein the slot configuration identifying the one or more third symbols comprises a dynamic slot configuration that causes the one or more second symbols to be dynamically configured by the network entity as the one or more third symbols; and
- means for transmitting a sidelink communication using the one or more first symbols or the one or more third symbols.

* * * * *